United States Patent [19]

Crane

[11] Patent Number: 4,888,939
[45] Date of Patent: Dec. 26, 1989

[54] BELT DRIVEN DISC CUTTERBAR

[75] Inventor: Jack W. Crane, New Holland, Pa.

[73] Assignee: Ford New Holland, Inc., New Holland, Pa.

[21] Appl. No.: 240,863

[22] Filed: Sep. 2, 1988

[51] Int. Cl.$^4$ ............................................. A01D 34/66
[52] U.S. Cl. ...................................... 56/13.6; 56/295; 56/235
[58] Field of Search ................... 56/6, 13.6, 16.9, 192, 56/255, 295, DIG. 6

[56] References Cited

U.S. PATENT DOCUMENTS

| | | | |
|---|---|---|---|
| 3,116,583 | 1/1964 | Mason | 56/13.6 |
| 3,138,911 | 6/1964 | Pounds | 56/235 |
| 3,457,714 | 7/1969 | Kamlukin | 56/503 |
| 4,110,959 | 9/1978 | Oosterling et al. | 56/6 |
| 4,160,356 | 7/1979 | Mathews | 56/192 |
| 4,275,547 | 6/1981 | Oosterling et al. | 56/192 |
| 4,302,922 | 12/1981 | Guerndt, Jr. et al. | 56/235 |
| 4,497,161 | 2/1985 | Vissers et al. | 56/192 |
| 4,653,253 | 3/1987 | Voler et al. | 56/13.6 |
| 4,671,050 | 6/1987 | van der Lely | 56/13.6 |
| 4,730,445 | 3/1988 | Wolff | 56/13.6 |
| 4,761,940 | 8/1988 | Wolff | 56/13.6 |

FOREIGN PATENT DOCUMENTS 1582353  8/1970  Fed. Rep. of Germany ............ 56/6

Primary Examiner—Bruce M. Kisliuk
Attorney, Agent, or Firm—Larry W. Miller; Frank A. Seemar; Darrell F. Marquette

[57] ABSTRACT

A disc cutterbar for use on a harvesting implement such as a disc mower-conditioner is driven by an endless belt entrained around sheaves corresponding to each disc cutter within the transmission casing. To prevent interference between overlapping knives on adjacent disc cutters, alternating disc cutters are obliquely mounted on the transmission casing and positioned slightly forwardly of adjacent upright disc cutters so that the path of travel of the knife thereon is within a plane spaced vertically within the overlap area relative to the path of rotation of the knives of the adjacent upright disc cutters. The obliquely mounted disc cutters are positioned such that the forward periphery of the path of rotation of the knives thereof is in substantially the same plane as the path of rotation of the upright disc cutters so that the disc cutterbar will attain a substantially uniform level of cut. The drive sheaves of the obliquely mounted disc cutters are also mounted such that the peripheral portion thereof engaged with the drive belt is in substantially the same plane as the drive sheaves on the upright disc cutters to minimize wear on the endless drive belt.

21 Claims, 6 Drawing Sheets

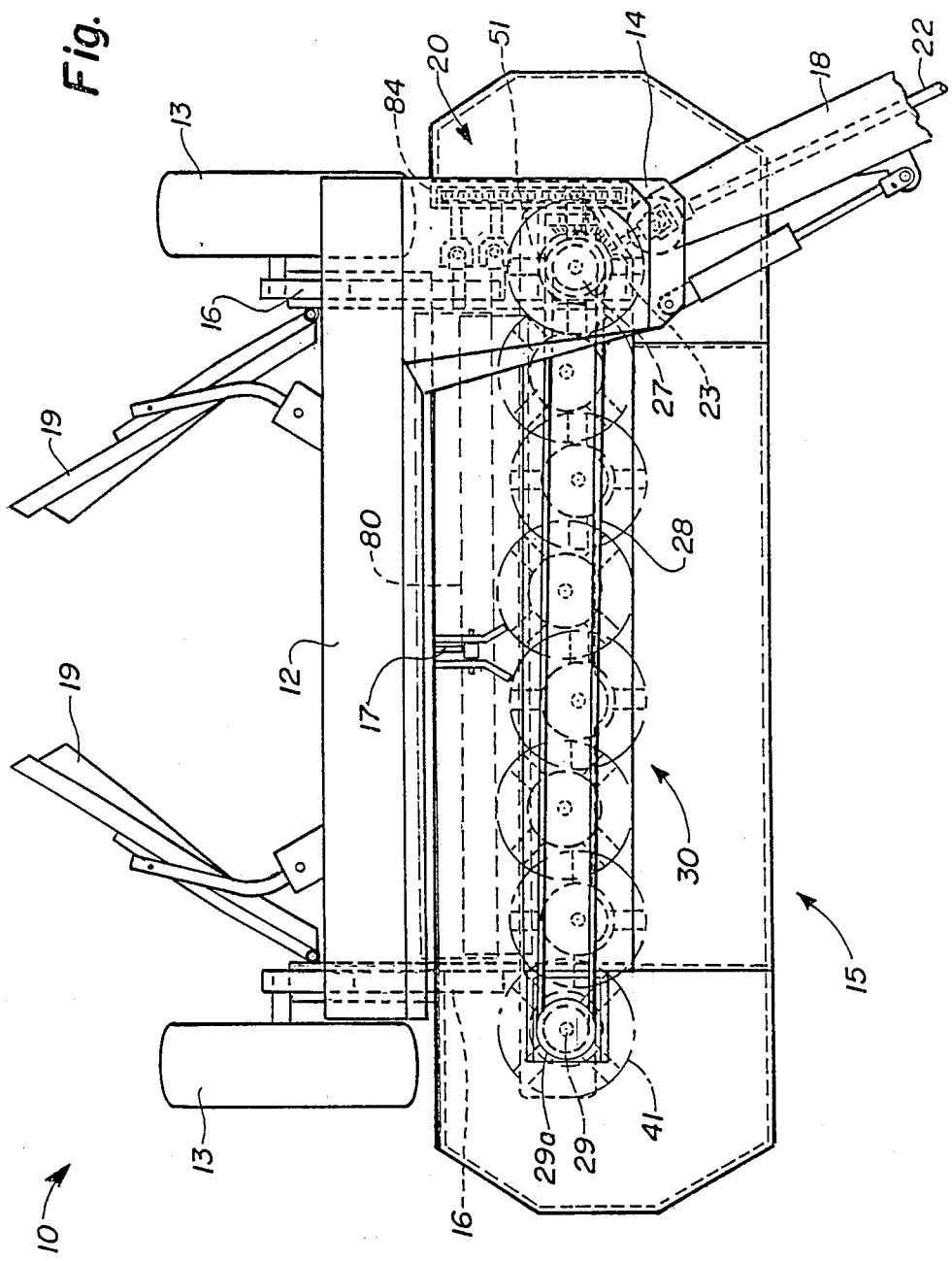

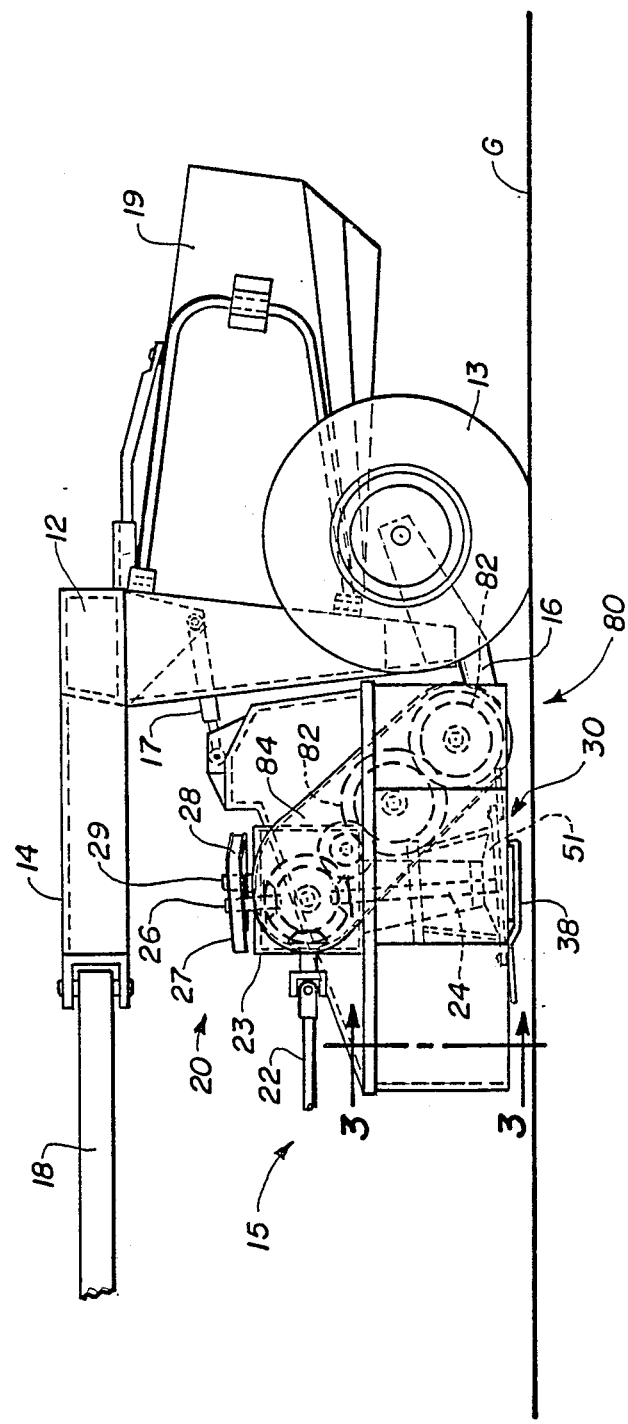

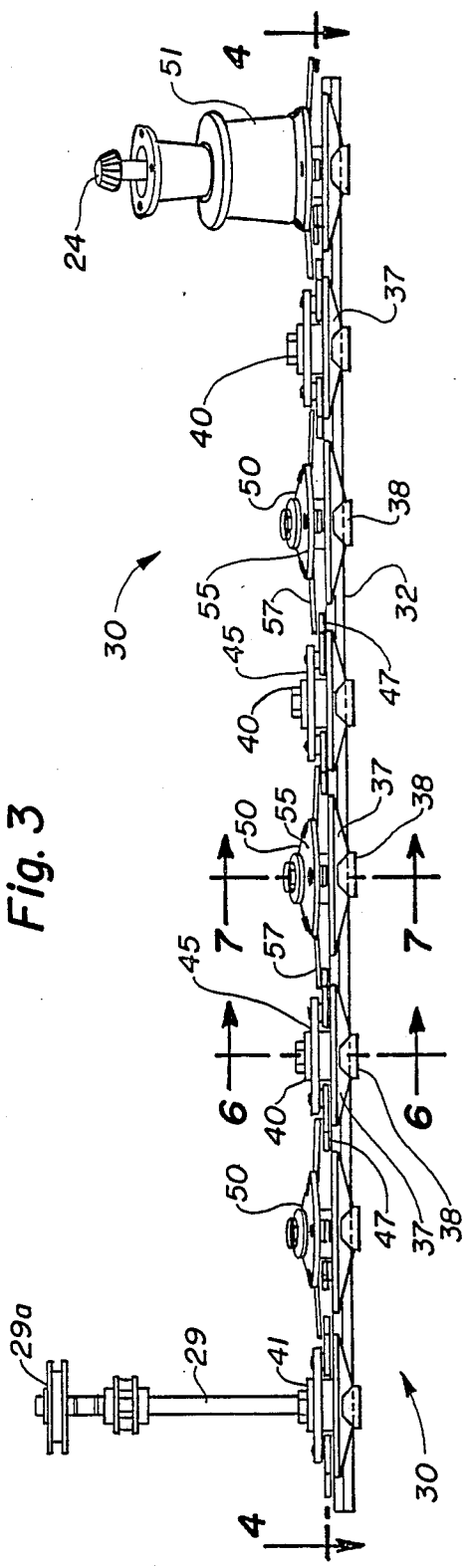
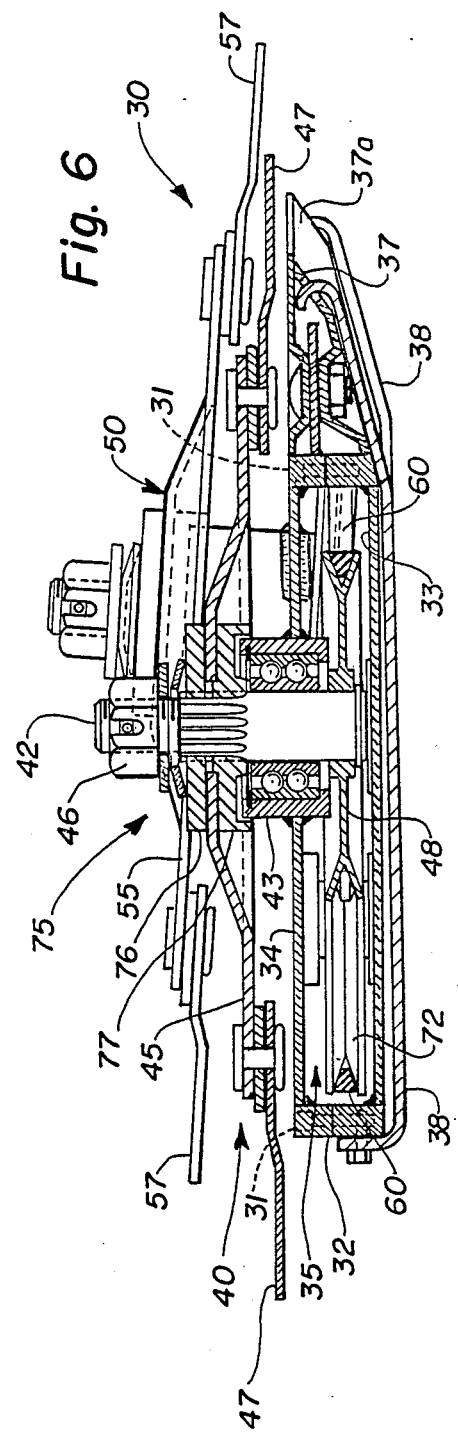

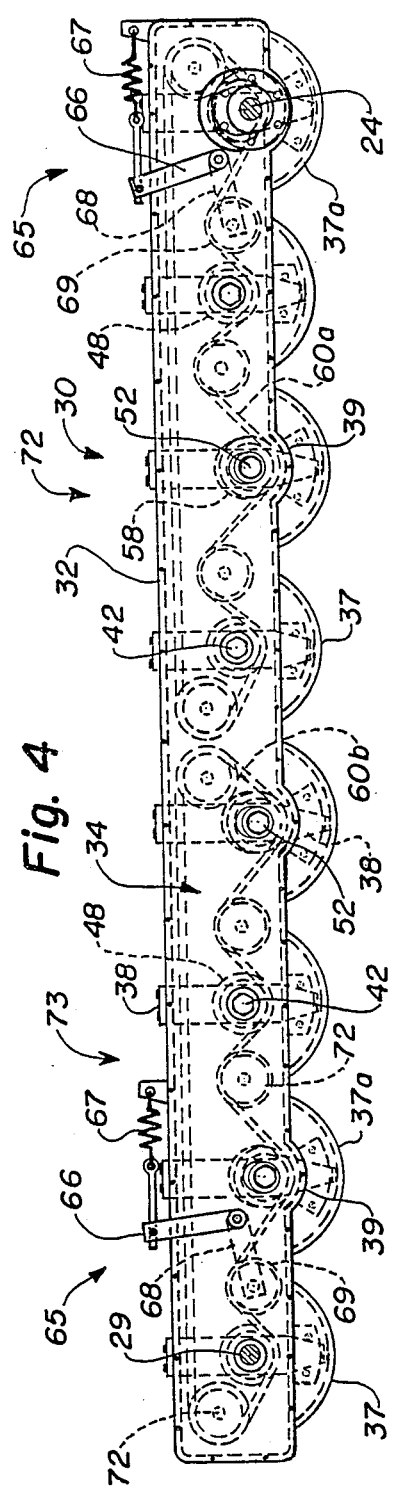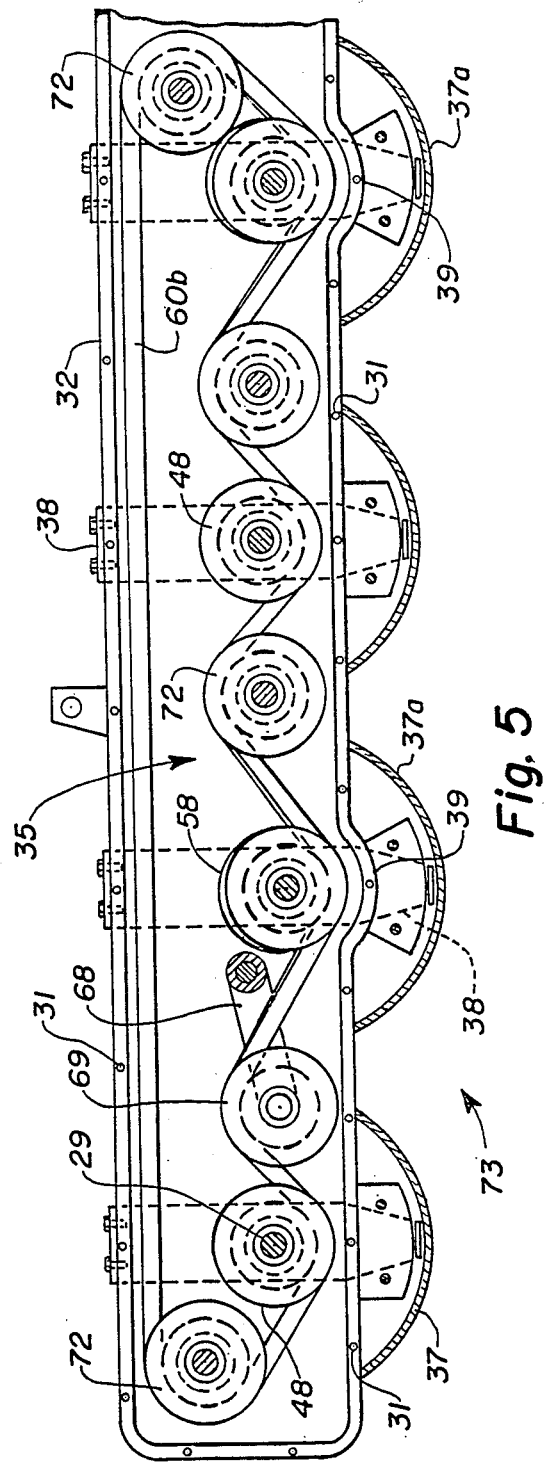

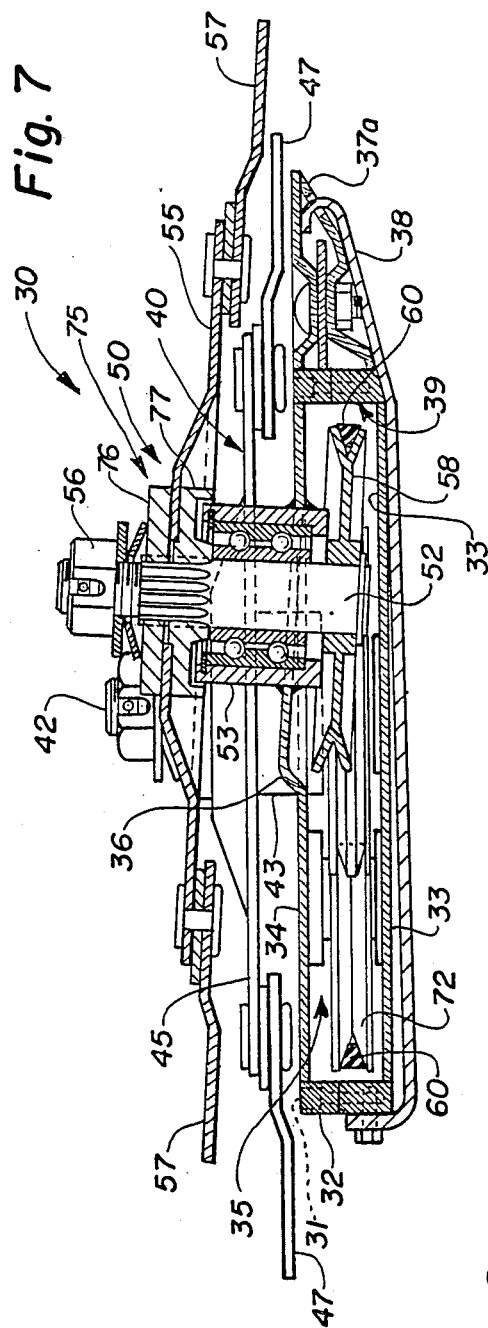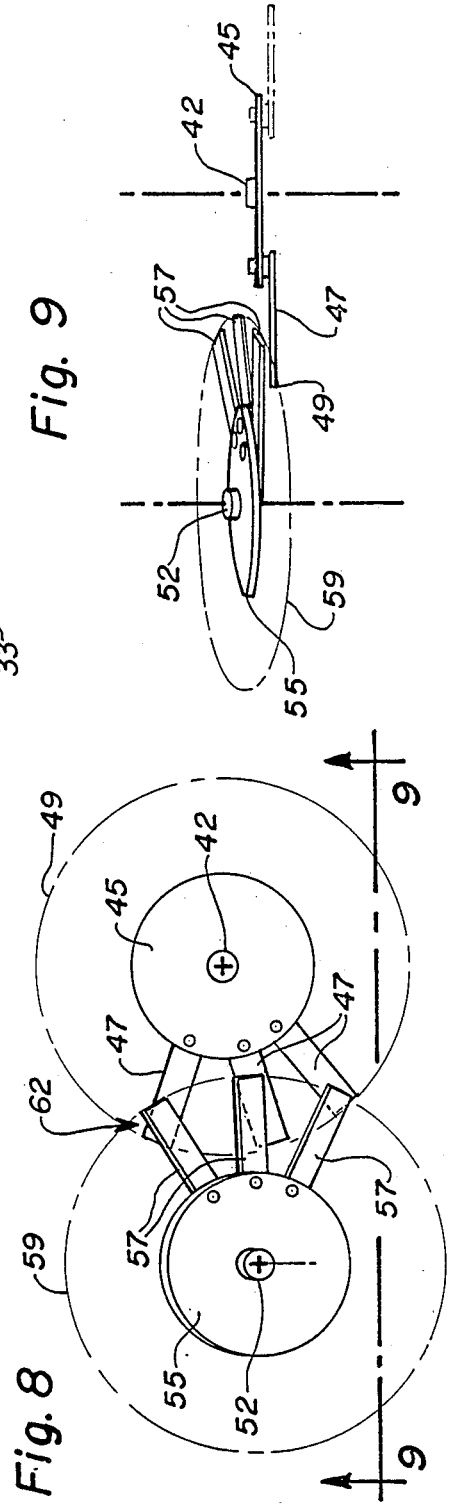

BELT DRIVEN DISC CUTTERBAR

BACKGROUND OF THE INVENTION

The present invention relates generally to crop harvesting machines commonly referred to as disc mower-conditioners and, more particularly, to a disc cutterbar configuration that permits the utilization of a drive belt to transfer rotational power between the respective disc cutters.

Typically, disc cutterbars used on implements such as disc mower-conditioners include a transmission casing mounting a plurality of disc cutters rotatable about an upright axis of rotation along the transverse width thereof. Each disc cutter is provided with a drive gear meshed with adjacent idler gears so as to form a power transmission train to transfer rotational power between all disc cutters. This gear driven drive train is expensive to manufacture and to maintain as it requires an oil tight transmission casing to encapsulate an oil bath for precision intermeshing gears.

Gear driven disc cutterbars further suffer from an inherent high level of noise during operation due to the intermeshing gear teeth. Susceptability to damage is also a significant problem with gear driven disc cutterbars because of the precise nature of the operation thereof. Any damage to a drive gear within the enclosed transmission casing normally results in additional damage to adjacent gears. Also, a required amount of lubrication is needed to be maintained within the oil tight transmission casing to dissipate the heat generated by the operation of the meshed gears and to provide sufficient lubrication therefor.

Attempts to provide a belt driven disc cutterbar have been made in the past; however, slippage between the driving power transmission belt and the engaged sheave creates interference problems between the rotating knives on adjacent discs as the path of rotation of the adjacent knives must overlap to prevent areas of uncut crop material between discs. One solution to this problem is to place the path of rotation of the respective adjacent rotating knives in different planes, such as seen in U.S. Pat. No. 3,138,911 and in U.S. Pat. No. 3,457,714. Such solutions provide an r unacceptable scallop-shaped cut compared to the uniform level of cut obtained from the gear driven disc cutterbar.

Accordingly, it would be desirable to provide a belt driven disc cutterbar whose operation and performance would at least approximate conventional gear driven disc cutterbars.

SUMMARY OF THE INVENTION

It is an object of this invention to overcome the aforementioned disadvantages of the prior art by providing a belt driven disc cutterbar having a substantially uniform level of cut.

It is another object of this invention to provide a belt driven disc cutterbar having alternating disc cutters staggered both in location and in angle of repose.

It is an advantage of this invention that the paths of rotation of adjacent disc cutters operate in vertically spaced planes within the overlap area between the adjacent disc cutters.

It is a feature of this invention that the paths of rotation of adjacent disc cutter knives do not require precise timing.

It is still another object of this invention to provide a belt driven disc cutterbar having a relatively uniform level of cut.

It is another feature of this invention that obliquely mounted disc cutters are positioned forwardly of the adjacent upright disc cutters to minimize the angle at which the obliquely mounted disc cutters are mounted to provide a relatively uniform level of cut.

It is another advantage of this invention that the rearward contour of the disc cutterbar is uniform to facilitate the positioning of conditioning rolls immediately rearwardly thereof.

It is yet another feature of this invention that the forward periphery of the path of rotation of the knives of the obliquely mounted disc cutters are positioned in substantially the same plane as the path of rotation of the knives on the upright disc cutters.

It is still another feature of this invention that the drive sheaves affixed to the obliquely mounted disc cutters within the transmission casing are positioned such that the portion thereof engaged with the endless drive belt is in substantially the same plane as the drive sheaves affixed to the adjacent upright disc cutters.

It is yet another advantage of this invention that the drive belt engaged with the drive sheaves affixed to the respective disc cutters rotates in substantially a planar fashion to maximize belt life.

It is yet another feature of this invention that the path of cut of the obliquely mounted disc cutters is positioned forwardly of the path of cut of the adjacent upright disc cutters.

It is yet another advantage of this invention that the operation of the belt driven disc cutterbar will be quieter than conventional gear driven disc cutterbars.

It is still another object of this invention to provide a disc cutterbar less susceptible to damage due to impact from disc cutters restricting rotation thereof.

It is still another feature of this invention that the driving engagement between a belt and a drive sheave affixed to the respective disc cutters provides an inherent slip clutch for each individual disc cutter in case of impact thereof restricting the respective rotation thereof.

It is yet another advantage of this invention that lubrication for the drive components within the transmission casing is not required.

It is a further advantage of this invention that the staggered location of adjacent drive sheaves also provides a greater angle of wrap of the drive belt around the drive sheaves, particularly when idler sheaves are not utilized between the drive sheaves.

It is still another feature of this invention that the utilization of a belt drive mechanism permits the transmission casing to be somewhat flexible without disturbing the operation of the drive train.

It is still a further advantage of this invention that the lack of intersection between paths of travel of the knives on adjacent discs permits a greater number of knives to be used on each disc to provide superior cutting capability.

It is a further object of this invention to arrange the disc cutters into two groups driven by separate drive belts, thereby reducing the power required to be transmitted by the drive belt.

It is yet another feature of this invention that a power transfer mechanism is provided between the end disc cutters above the transmission casing to provide rotational power to each group of disc cutters.

It is yet a further advantage of this invention that the oblique path of rotation of the alternate disc cutters will assist the feeding of severed crop material rearwardly into the conditioning mechanism.

It is yet a further object of this invention to provide a belt driven disc cutterbar which is durable in construction, inexpensive of manufacture, carefree of maintenance, facile in assemblege, and simple and effective in use.

These and other objects, features and advantages are accomplished according to the instant invention by providing a disc cutterbar for use on a harvesting implement such as a disc mower-conditioner which is driven by an endless belt entrained around sheaves corresponding to each disc cutter within the transmission casing. To prevent interference between overlapping knives on adjacent cutterbars, alternating disc cutters are obliquely mounted on the transmission casing and positioned slightly forwardly of adjacent upright disc cutters so that the path of travel of the knive thereon is within a plane spaced vertically within the overlap area relative to the path of rotation of the knives of the adjacent upright disc cutters. The obliquely mounted disc cutters are positioned such that the forward periphery of the path of rotation of the knives thereof is in substantially the same plane as the path of rotation of the upright disc cutters so that the disc cutterbar will attain a substantially uniform level of cut. The drive sheaves of the obliquely mounted disc cutters are also mounted such that the peripheral portion thereof engaged with the drive belt is in substantially the same plane as the drive sheaves on the upright disc cutters to minimize wear on the endless drive belt.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a partial top plan view of a disc mower-conditioner including a belt driven disc cutterbar incorporating the principles of the instant invention, the forward portion of the draft tongue and power input shaft being broken away;

FIG. 2 is a left side elevational view of the disc mower-conditioner seen in FIG. 1;

FIG. 3 is a front elevational view of the disc cutterbar forming a part of the disc mower-conditioner shown in FIGS. 1 and 2 and corresponding to lines 3—3 of FIG. 2, the drum structure of the right end disc cutter being removed for purposes of clarity with respect of the drive mechanism therefor;

FIG. 4 is a cross-sectional view of the disc cutterbar taken along lines 4—4 of FIG. 3;

FIG. 5 is an enlarged partial cross-sectional view of the disc cutterbar similar to that of FIG. 4, but taken below the upper surface of the transmission casing and showing only the right group of disc cutters;

FIG. 6 is a cross-sectional view of the disc cutterbar corresponding to lines 6—6 of FIG. 3 taken through one of the upright disc cutters;

FIG. 7 is a cross-sectional view of the disc cutterbar corresponding to lines 7—7 of FIG. 3 taken through one of the oblique disc cutters;

FIG. 8 is a schematic, diagramatic plan view of adjacent disc cutters showing the rotation of the respective knives at three corresponding positions within the overlap area therebetween;

FIG. 9 is a schematic elevational view of the adjacent disc cutters corresponding to lines 9—9 of FIG. 8 to depict the vertical separation of the planes in which the adjacent knives rotate within the overlap area;

DETAILED DESCRIPTION OF THE PREFERRED EMBODIMENT

Figure 10:
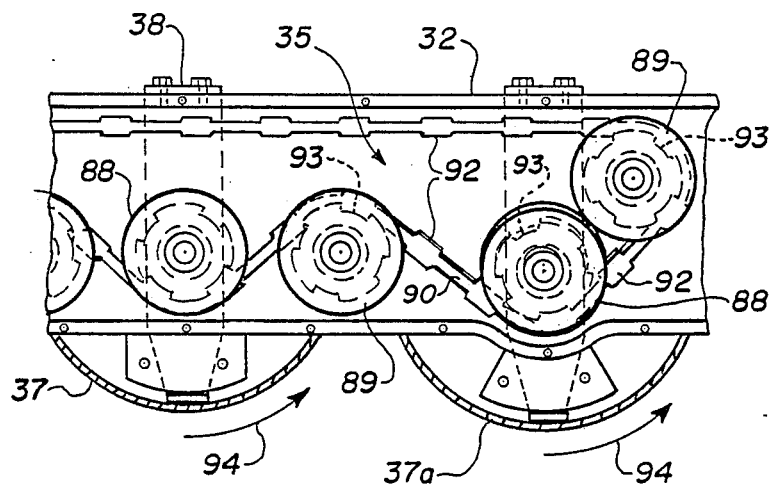
FIG. 10 is an enlarged detail view corresponding to the two inboardmost disc cutters depicted in FIG. 5 showing an alternative drive belt configuration.

Referring now to drawings and, particularly, to FIG. 1, a top plan view of a crop harvesting machine, commonly referred to as a disc mower-conditioner, can be seen. Any left and right references are used as a matter of convenience and are determined by standing at the rear of the machine, facing the forward end, the direction of travel.

Referring to FIGS. 1 and 2, it can be seen that the disc mower-conditioner 10 is provided with a frame 12 supported over the ground G by ground engaging wheels 13. The disc mower-conditioner 10 includes a header 15 supported from the frame 12 by lower header lift links 16 and a centrally positioned adjustable upper header lift link 17 to permit generally vertical movement of the header 15 relative to the frame 12 by a conventional lift mechanism (not shown), such as a hydraulic cylinder. The frame 12 also includes a forwardly projecting portion 14 which is pivotally connected to a draft tongue 18, adaptable at the forward end thereof for connection to a towing vehicle, such as a tractor, in a conventional manner (not shown). The frame 12 also supports a pair of rearwardly converging windrow shields 19 operable to form a windrow of crop material after being discharged from the header 15.

Referring now to FIGS. 1-3, the drive mechanism 20 can best be seen. A power input shaft 22 extends forwardly for connection to a rotating member on the prime mover (not shown), such as a tractor power take-off shaft. One skilled in the art will readily realize that FIGS. 1 and 2 have the forward portions of the tongue 18 and the power input shaft 22 broken away; however, connection thereof to the prime mover is conventional and well known in the art. The power input shaft 22 delivers rotational power to a gear box 23 forming a part of the header 15 to be movable therewith. The gear box 23 is provided with a first output shaft 24 extending in a generally downwardly direction to provide rotational power to the left end of the disc cutterbar 30. The gear box 23 is also provided with a second output shaft 26 extending generally upwardly therefrom and terminating in a sheave 27 affixed thereto. A power transfer mechanism 28 in the form of an endless belt transfers the rotational power from the second output shaft 26 to a driven shaft 29 and affixed sheave 29a corresponding to the right end of the disc cutterbar 30. According, the disc cutterbar 30 is provided with a source of rotational power to both opposing ends thereof.

The structural details of the disc cutterbar 30 can best be seen in FIGS. 4-7. The disc cutterbar 30 is provided with an elongated, transversely extending transmission casing 32 having an upper portion 34, above which is rotatably operable individual disc cutters 40, 50, and a separable lower portion 33. The transmission casing 32 is formed with a hollow cavity 35 within which a drive transmission mechanism 20 is operably positioned. The transmission casing 32 is also provided with semi-circular guard members 37, 37a projecting forwardly therefrom beneath the path of rotation of each respective disc cutter 40, 50 and a skid shoe 38 extending beneath the transmission casing 32 and attached to the respective guard member 37, 37a and the rear of the lower portion 33 of the transmission casing 32 to provide a structure for engagement of the ground G.

It can be seen that the upper portion 34 of the transmission casing 32 carries the bearings 43, 53 for the respective disc cutters 40, 50. The removal of the lower portion 33 from the upper portion 34 permits access to the drive transmission mechanism 20 which remains connected to the upper portion 34. Separation of the upper portion 34 from the lower portion 33 can be accomplished by removing the fasteners 31 spaced around the periphery of the transmission casing 32 and holding the two portions 33, 34 together.

As is particularly evident in FIGS. 3, 6 and 7, the disc cutterbar 30 is provided with alternating upright disc cutters 40 and obliquely mounted disc cutters 50. In the configuration seen in FIG. 3, the left endmost disc cutter 51 is positioned immediately beneath the gear box 23 to receive rotational power immediately therefrom via the first output shaft 24. The left endmost disc cutter 51 and the associated first output shaft 24 are mounted obliquely to a generally vertical orientation in a manner described in greater detail below. Conversely, the right endmost disc cutter 41 is generally vertical and rotatable about an axis corresponding to the shaft 29 which delivers rotational power thereto. Beginning with the left endmost disc cutter 51, each alternating disc cutter member 50 along the transverse length of the disc cutterbar 30 is obliquely mounted, while the alternating disc cutters 40 therebetween are generally vertically oriented as is the right endmost disc cutter 41. Both endmost disc cutters 41, 51 are provided with conventional divider drums to facilitate a dividing of uncut severed crop material and a rearward conveying of the severed crop material. In FIG. 3, the drum on the right endmost disc cutter 41 has not been shown to more clearly depict the shaft 29.

Referring now to the cross-sectional view of FIG. 6, the structural detail of the upright disc cutters 40 can best be seen. Each upright disc cutter 40 is provided with a generally vertical shaft 42 rotatably mounted within a bearing housing 43 mounted in the upper portion 34 of the transmission casing 32 to define an upright axis of rotation for the disc cutter 40. Mounted onto the upper end of the shaft 42 above the upper surface 34 is a rotatable disc member 45 which is preferably of a generally circular shape, although other configurations would be acceptable. Each disc member 45 is provided with a number of pivotally mounted knives 47, preferably four knives (although more or less knives could be used) spaced equidistantly around the perimeter of the disc member 45, to sever standing crop material by impact action.

The disc member 45 is sandwiched between an upper half 76 and a lower half 77 of a split hub member 75 which is splined onto the shaft 42 to be rotatable therewith. A spring-loader fastening device 46, preferably in the form of a Belleville washer and nut assembly, clamps the disc member 45 between the two halves 76, 77 of the hub 75 with an adjustable frictional clamping force. Should the disc member 45 encounter an object restricting its rotation, the disc member 45 could rotate relative to the hub member 75 to minimize damage to the remaining components of the disc cutterbar 30.

Since the axis of rotation defined by the shaft 42 is substantially vertical, the plane in which the path of the rotating knives 47 follows is substantially horizontal. The forward perphery of this path of rotation carries the tip of the knives 47 forwardly of the corresponding semi-circular guard 37 for engagement thereof with the standing crop material. A sheave 48 is affixed to the lower end of the shaft 42 within the cavity 35 of the transmission casing 32 so as to be rotatable therewithin. As shown in FIG. 6, the sheave 48 rotates in a plane substantially parallel to the upper surface 34 of the transmission casing 32.

Referring now to the cross-sectional view of FIG. 7, the structural detail of the oblique disc cutters 50 can best be seen. The construction of the oblique disc cutters 50 is substantially similar to that described above with respect to the upright disc cutters 40. The oblique disc cutters 50 are provided with a shaft 52 rotatably supported within a bearing housing 53 affixed to the upper surface 34 the transmission casing 32. Unlike the upright shaft 42, the top of the shaft 52 is tipped forwardly so as to define an axis of rotation for the oblique disc cutters 50 at an angle inclined to vertical. A disc member 55 is clamped in a split hub member 75 splined onto the top of the shaft 52 to be rotatable therewith and is frictionally held therein by a removable spring-loaded fastening device 56. Knives 57 are pivotally connected to the disc member 55 for rotation therewith about a plane perpendicular to the axis of rotation defined by the shaft 52. Accordingly, one skilled in the art will readily see that the path of travel of the knives 57 is in a plane tilted with respect to the plane of the path of rotation of the knives 47. A sheave 58 is affixed to the lower end of the shaft 52 so as to be rotatable within the cavity 35 in a plane generally parallel to the path of rotation of the knives 57.

Referring now to FIGS. 4–7, it can be seen that the shafts 52 are not only obliquely tipped relative to the axis of the shafts 42, the shafts 52 are positioned forwardly relative to the shafts 42, i.e., a line interconnectingly all of the shafts 52 would be located forwardly of a line interconnecting all of the shafts 42. This configuration places the forwardmost periphery of the rotating knives 57 in front of the forwardmost periphery of the rotating knives 57 in front of the forwardmost periphery of the rotating knives 47. Consequently, the semi-circular guards 37a corresponding to the oblique disc cutters 50 are somewhat larger and extend forwardly of the semi-circular guards 37 corresponding to the upright disc cutters 40.

The location of the shafts 52, with respect to both angularity and fore-and-aft positioning, relative to the shafts 42 positions the forwardmost periphery of the path of rotation of the knives 57 at a location not only forwardly of the forwardmost periphery of the path of rotation of the knives 47, but in substantially the same plane thereof. In other words, plane of the path of rotation of the knives 47 intersects the plane of the path of rotation of the knives 57 at a point substantially coincidental with the forward periphery of the path of rotation of the knives 57. By positioning the shafts 52 forwardly of the shafts 42, the angle of repose of the shafts 52 relative to a vertical orientation necessary to position the forward periphery of the knives 57 within the plane of the path of rotation of the knives 47 is lessened. This particular configuration will provide a relatively uniform level of cut across the entire transverse width of the disc cutterbar 30 during rotation of the disc cutters 40, 50, although one skilled in the art will readily realize that a slight uneven scalloping will be created by the rotation of the obliquely mounted disc cutters 50; however, the unevenness of the cutting is barely noticeable.

The rotation of the sheaves 58 in the oblique position described above within the narrow confines of the cavity 35 and the necessity of providing operational clearances therefor, including clearances needed for removing and replacing drive belts 60, creates the need to adapt the structural shape of the transmission casing 32 to accomodate the obliquely mounted sheaves 58. As is best noted in FIG. 7, the upper surface 34 of the transmission casing 32 is provided with a raised portion 36 immediately rearwardly of each shaft 52 to provide clearance for the angularly disposed sheave 58 within the cavity 35 of the transmission casing 32. As best seen in FIGS. 4 and 5, the spatial interference encountered between the transmission casing 32 and the forward portion of the sheaves 58 can be accommodated by a corresponding bubble 39 formed in the transmission casing 32 immediately forwardly of each respective sheave 58.

As schematically shown in FIGS. 8 and 9, the path of rotation 49 of the knives 47 overlaps the adjacent path of rotation 59 of the knives 57 so as to form an overlap area 62 therebetween. FIGS. 8 and 9 reflect three of the possible interferring positions between knives 47 and 57 within the overlap area 62, e.g., at the respective forward and rearward ends of the overlap area 62 and at the middle thereof. The plane of the path of rotation 59 is spaced vertically above the plane of the path of rotation 49 at all locations throughout the overlap area 62. Accordingly, unless the knives 47, 57 are damaged so as to be bent out of their intended path of rotation 49, 59, there will be no interference between knives of adjacent discs even when knives from both adjacent discs are within the overlap area 62 simultaneously. Consequently, a disc cutterbar 30 constucted as described above has no necessity for timing the rotation of adjacent disc cutters.

Referring now to FIGS. 4-7, it can be seen that rotational power is transferred between disc cutters 40, 50 by a V-belt 60 entrained around corresponding sheaves 48, 58. A tensioning mechanism 65 includes a first arm 66 positioned above the upper surface of the transmission casing 32 and biased by a spring 67 anchored to the transmission casing 32. A second arm 68 positioned within the cavity 35 below the upper surface 34 to be movable with the first arm 66 carrys a tensioning sheave 69 engaged with the V-belt 60 to provide appropriate tension thereto as exerted by the biasing spring 67. As best seen in FIGS. 6 and 7, the forward portions of the sheaves 58 are located in substantially the same plane defined by the generally horizontal sheaves 48. Since the V-belt 60 is in engagement with the sheaves 58 along this forward portion thereof and with the sheaves 48, the V-belt 60 is substantially operable within a fixed plane corresponding to the sheaves 48 so as to minimize vertical flexing thereof, which in turn maximizes operational life.

Referring now to FIGS. 1-7, it can be seen that a disc cutterbar 30 having as many as eight disc cutters spaced along the transverse width thereof is preferebly constructed with two V-belts 60a, 60b, each providing driving power to half of the disc cutters 40, 50. The first group 71 of disc cutters 40, 50, corresponding to the left half of the disc cutterbar 30, is rotatably driven from the left endmost disc cutter 51 via the first output shaft 24 directly providing rotational power to the sheave 58 corresponding thereto. The endless V-belt 60a is entrained around the idler sheaves 72, a tensioning sheave 69 and the drive sheaves 48, 58 corresponding to the first four disc cutters 40, 50. The rotation of the first V-belt 60a is clockwise as depicted in the plan view of FIG. 4 so as to rotate the first four disc cutters 40, 50 inwardly toward the center of the disc cutterbar 30.

The second group 73 of disc cutters 40, 50 correspond to the right half of the disc cutterbar 30 and are driven directly by the shaft 29 which in turn is operably driven by the power transfer belt 28 transferring power from the second output shaft 26. The second V-belt 60b is entrained around corresponding idler sheaves 72, a second tensioning sheave 69 and the drive sheaves 48, 58 corresponding to the four disc cutters on the right side of the disc cutterbar 30 to transfer rotational power from the drive sheave 48 corresponding to the right endmost disc cutter 41. The direction of rotation of the second V-belt 60b is counter-clockwise as depicted in the plan view of FIGS. 4 and 5 so as to rotate the four disc cutters 40, 50 in the second group 73 inwardly toward the center of the disc cutterbar 30.

The inward direction of rotation of each respective disc cutter 40, 50 directs the flow of severed crop material inwardly toward the center of the disc cutterbar 30 into a conditioning mechanism 80 supported by the frame 12 immediately rearwardly of the disc cutterbar 30, as best seen in FIGS. 1 and 2. The conditioning mechanism 80 is preferably in the form of a pair of counterrotating, intermeshed conditioning rolls 82 of conventional design positioned to receive severed crop material directly from the disc cutterbar 30. The discharge of conditioned crop material from the conditioning mechanism 80 passes into the windrow shields 19 for converging thereof into a consolidated windrow on the ground immediately rearwardly of the machine 10. Rotational power to the conditioning rolls 82 is provided from a gear set 84 receiving rotational power from the gear box 23 in a generally conventional manner. As seen in FIGS. 1 and 2, the conditioning mechanism may be formed as a part of the header 15 so that the relationship between the conditioning mechanism 80 and the disc cutterbar 30 remains constant irrespective of the relative position of the header 15 relative to the frame 12.

Figure 11:
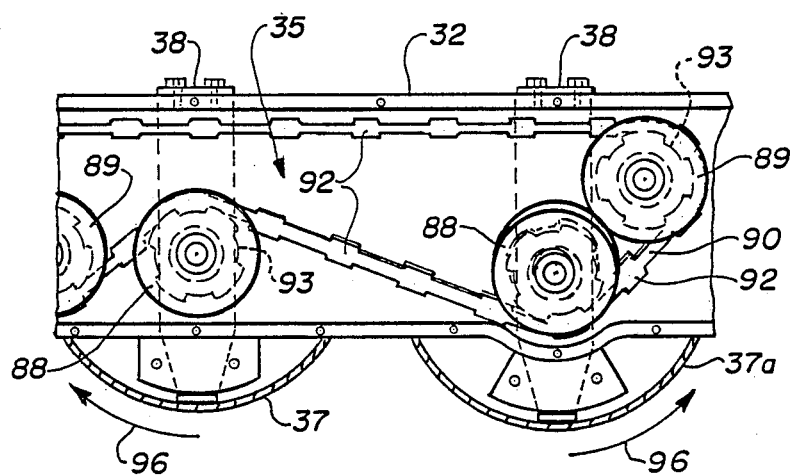
FIG. 11 is an enlarged detail view similar to that of FIG. 10 but depicting an alternative engagement between the drive sheaves to effect an alternating direction of rotation of the upright disc cutters.

Referring now to FIGS. 10 and 11, an alternative embodiment of the drive mechanism for the disc cutterbar 30 can best be seen. Substituting toothed sprockets 88 for the drive sheaves 48, 58, as well as toothed idler sprockets for the idler sheaves 72 and tensioning sheaves 69, the V-belt 60 could be replaced with a double sided, toothed timing belt 90. The timing belt 90 is provided with teeth 92 having a configuration corresponding to indentations 93 on the toothed drive sprockets 88 and on the toothed idler sprockets 89 to provide a positive drive therebetween. The utilization of a toothed timing belt 90 provides a means to more positively drive the disc cutters 40, 50 and thereby time the rotation between respective adjacent disc cutters 40, 50 without encountering the manufacturing and operational expenses of gear driven disc cutterbars. However, the drive sprockets 88 could still slip relative to the timing belt 90 without causing major damage to the cutterbar 30 if the rotation thereof were impeded.

The placement of teeth 92 on both sides of the timing belt 90 permits the rotation of the adjacent disc cutters 40, 50 to have differing configurations, as seen in comparison between FIG. 10 and FIG. 11. Entraining the timing belt 90 around the sprockets 88 similar to that described above with respect to FIGS. 1-7, would rotate adjacent cutters in identical directions indicated by the arrows 94 in FIG. 10. Entraining the timing belt 90 around the forward portion of one drive sprocket 88 and around the rearward portion of the adjacent drive sprocket 88 permits the adjacent disc cutters to be driven in opposing directions as indicated by arrows 96 in FIG. 11.

The varying of the rotational configuration of the individual disc cutters 40, 50 can be accomplished whether a V-belt 60 or a timing belt 90 is utilized. Referring to a V-belt embodiment of the drive mechanism 20, the staggered location of adjacent disc cutters 40, 50 permits an adequate wrapping of the drive belt 60 around the respective drive sheaves 48, 58 to effect the transfer of power therebetween irrespective of whether an idler 72 is used. For machines such as depicted in FIGS. 1 and 2, where the transverse width of the conditioning mechanism 80 is less than the transverse cutting width of the disc cutterbar 30, it may be desireable to rotate the first two disc cutters at both ends of the disc cutterbar 30 inwardly, such that the forward periphery of the path of rotation thereof moves toward the center of the cutterbar 30, while reversing the alternate disc cutters therebetween, the result being a feeding of all the severed crop into the conditioning mechanism 80.

The utilization of a belt drive mechanism within the transmission casing 32 will provide a lower cost disc cutterbar 30 when compared to gear driven cutterbars. The belt driven disc cutterbar 30 will be quieter in operation than conventional gear driven disc cutterbars. Since timing of adjacent disc cutters is not required by virtue of the vertical separation of the paths of rotation within the overlap area 62, any number of knives can be used on the respective disc cutters. The preferred number of four knives per disc cutter is believed to provide a satisfactory cutting performance without leaving strips of uncut crop material between adjacent blades; however, more or less knives per disc cutter could be used as well.

The belt driven disc cutterbar will be less susceptible to damage because of the ability of the drive sheaves to slip relative to the engaged drive belt with respect to each individual disc cutter should rotation of that disc cutter become impeded, such as by impact with a substantial object. The ability of the disc member 45, 55 to rotate relative to the hub member 75 mounting the respective disc member 45, 55 to the corresponding shaft 42, 52 also provides a secondary capability for the disc cutterbar 30 to escape extensive damage upon impact with a substantial object.

Since rotational power is delivered between disc cutters by a drive belt, no lubrication is required for the drive transfer mechanism and, hence, the transmission casing 32 is not required to be sealed. The above-described configuration of a disc cutterbar 30 provides for a uniform rear contour of the cutterbar 30 permitting the conditioning rolls 82 to nest closely adjacent to the cutterbar 30. Using a belt drive to transfer rotational power between disc cutters permits a more flexible transmission casing 32 to be used without causing a disruption to the drive mechanism 20. Conversely, gear driven disc cutterbars cannot tolerate flexing in the transmission casing due to the precise intermeshing relationship between adjacent gears.

It will be understood that changes in the details, materials, steps and arrangement of parts which have been described and illustrated to explain the nature of the invention will occur to and may be made by those skilled in the art upon a reading of this disclosure within the principles and the scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. In a disc mower-conditioner having a frame; a disc cutterbar supported from said frame for engagement with standing crop material to effect a severing thereof, said disc cutterbar including a hollow transmission casing rotatably supporting a plurality of disc cutters above an upper surface thereof, each said disc cutter having at least one knife connected thereto and rotatable therewith to sever standing crop material by impact action, said disc cutterbar further including a drive transmission means within said casing and engageable with said disc cutters; conditioning means supported by said frame rearwardly of said disc cutterbar to receive severed crop material for conditioning thereof; and drive means operably associated with said drive transmission means to provide rotational power thereto, an improved disc cutterbar comprising:

said disc cutters being mounted on said transmission casing so that the axis of rotation of alternating disc cutters is oriented obliquely with respect to the axis of rotation of immediately adjacent disc cutters, said obliquely mounted disc cutters being mounted on said transmission casing forwardly of the adjacent disc cutters; and said drive transmission means including a drive belt drivingly engaged with a drive sheave affixed to each said disc cutter, the drive sheaves associated with said obliquely mounted disc cutters being positioned forwardly of the drive sheaves associated with the disc cutters immediately adjacent thereto.

2. The disc mower-conditioner of claim 1 wherein the axis of rotation of said obliquely mounted disc cutters is tilted forwardly relative to the adjacent disc cutters.

3. The disc mower-conditioner of claim 1 wherein the rotation of adjacent disc cutters define overlap areas between said adjacent disc cutters through which the rotational path of the knives on said adjacent disc cutters pass when viewed from above, said knives on the adjacent disc cutters rotatably traveling through nonparallel, vertically spaced planes within said overlap area.

4. The disc mower-conditioner of claim 3 wherein said drive sheave on each said obliquely mounted disc cutter is positioned such that the peripheral portion thereof drivingly engaged with said drive belt is in substantially the same plane as the drive sheave on the adjacent disc cutters, so that said drive belt is operable substantially within a plane inside of said transmission casing.

5. The disc mower-conditioner of claim 4 wherein said drive transmission means includes two drive belts, each said drive belt rotatably driving half of said disc cutters.

6. The disc mower-conditioner of claim 5 wherein said drive means includes a power transfer means extending laterally across said disc mower-conditioner to provide rotational power simultaneously to the opposing endmost disc cutters on said disc cutterbar.

7. The disc mower-conditioner of claim 3 wherein the forward periphery of the path of rotation of the knives on said disc cutters is substantially in the same plane.

8. The disc mower-conditioner of claim 7 wherein said transmission casing is provided with a guard projecting forwardly therefrom beneath the path of rotation of each said disc cutter such that said knives extend peripherally beyond the corresponding guard to engage standing crop material, the guards corresponding to said obliquely mounted disc cutters extending forwardly from said transmission casing beyond the guards corresponding to the adjacent said disc cutters.

9. The disc mower-conditioner of claim 8 wherein the upper surface of said transmission casing is provided with a raised portion rearwardly of the axis of rotation of said obliquely mounted disc cutters to accommodate the obliquely positioned drive sheave affixed to said obliquely mounted disc cutter within said transmission casing.

10. A disc cutterbar operable to sever standing crop material by impact action comprising:
a hollow transmission casing having an upper surface and defining a cavity therewithin;
a plurality of transversely spaced upright disc cutters rotatably mounted on said transmission casing for rotation thereabove, each said upright disc cutter carrying at least one knife for rotation about a first path of travel within a first place oriented substantially parallel to said upper surface of said transmission casing, each said upright disc cutter having an upright shaft defining an axis of rotation substantially perpendicular to said upper surface of said transmission casing, each said upright shaft for rotation therewith within said transmission casing cavity;
a plurality of transversely spaced oblique disc cutters rotatably mounted on said transmission casing in an alternating configuration with said upright disc cutters, each said oblique disc cutter carrying at least one knife for rotation therewith in a second path of travel and having a rotatable shaft defining an axis of rotation oriented obliquely to the upright shafts of said upright disc cutters such that said second path of travel is in a second plane oriented angularly relative to said first plane, each oblique disc cutter being mounted forwardly of each adjacent upright disc cutter, each said oblique disc cutter also having a drive sheave affixed to said rotatable shaft for rotation therewith within said transmission casing activity, each said drive sheave corresponding to an oblique disc cutter being positioned forwardly of the drive sheave corresponding to the adjacent upright disc cutters, said transmission casing being formed with a forwardly extending projection to accommodate each forwardly positioned drive sheave corresponding to an oblique disc cutter;
when viewed from above, said first and second paths of travel defining an overlap area between adjacent disc cutters through which the corresponding knives on both adjacent disc cutters pass during rotation through said respective paths of travel, said first and second planes are vertically separated within said overlap area so that said respective knives do not interfere during rotation;
an endless belt entrained around the drive sheaves corresponding to each said upright and oblique disc cutter for drivingly rotating said disc cutters; and
drive means operatively associated with said endless belt to deliver rotational power thereto.

11. The disc cutterbar of claim 10 wherein said endless belt is engaged with each said drive sheave along a peripheral portion thereof, the corresponding peripheral portions of said drive sheaves lying in substantially planar orientation so that said endless belt is rotatable substantially within a third plane located within said transmission casing cavity generally parallel to said first plane.

12. The disc cutterbar of claim 11 wherein the forward periphery of said first and second paths of travel are positioned in a common plane.

13. The disc cutterbar of claim 11 wherein said first and second planes intersect at the forward periphery of said second path of travel.

14. The disc cutterbar of claim 11 wherein the upper surface of said transmission casing is provided with a raised portion rearwardly of the axis of rotation of each said obliquely mounted disc cutter to accommodate the obliquely oriented drive sheave affixed to the corresponding rotatable shaft within said transmission casing cavity.

15. The disc cutterbar of claim 14 wherein the axis of rotation of each said oblique disc cutter is tilted forwardly relative to the axes of rotation of said upright disc cutters.

16. The disc cutterbar of claim 14 wherein said transmission casing is provided with a guard projecting forwardly therefrom beneath the path of rotation of each said disc cutter, the guards corresponding to said oblique disc cutters extending forwardly of the guards corresponding to said upright disc cutters as the forward periphery of said second path of travel extends forwardly of the forward periphery of said first path of travel.

17. The disc cutterbar of claim 14 wherein said upright and oblique disc cutters are arranged in two transversely spaced groups, each said group having alternating upright and oblique disc cutters and being operatively driven by a separate corresponding endless belt.

18. The disc cutterbar of claim 17 having first and second opposing end disc cutters, each said end disc cutter being a part of a corresponding said group of disc cutters and being respectively operatively engaged with the corresponding said endless belt, said drive means being operatively connected to both said end disc cutters to effect rotation thereof, each said endless belt transferring rotational power to the remaining disc cutters in the corresponding group of disc cutters.

19. The disc cutterbar of claim 18 wherein said drive means includes a drive transfer means operatively connected between said end disc cutters above said transmission casing to transfer rotational power therebetween.

20. The disc cutterbar of claim 19 further including idler sheaves rotatably mounted within said transmission casing cavity and positioned between said drive sheaves in operative engagement with the corresponding endless belt such that all said disc cutters in each said group rotate in the same direction to direct severed crop away from the corresponding end disc cutter.

21. The disc cutterbar of claim 14 wherein the upper surface of said transmission casing is removable.

* * * * *